Jan. 6, 1970 V. J. SERIO, JR 3,487,529
SEAL MOUNTING APPARATUS AND METHOD
Filed Aug. 11, 1966 3 Sheets-Sheet
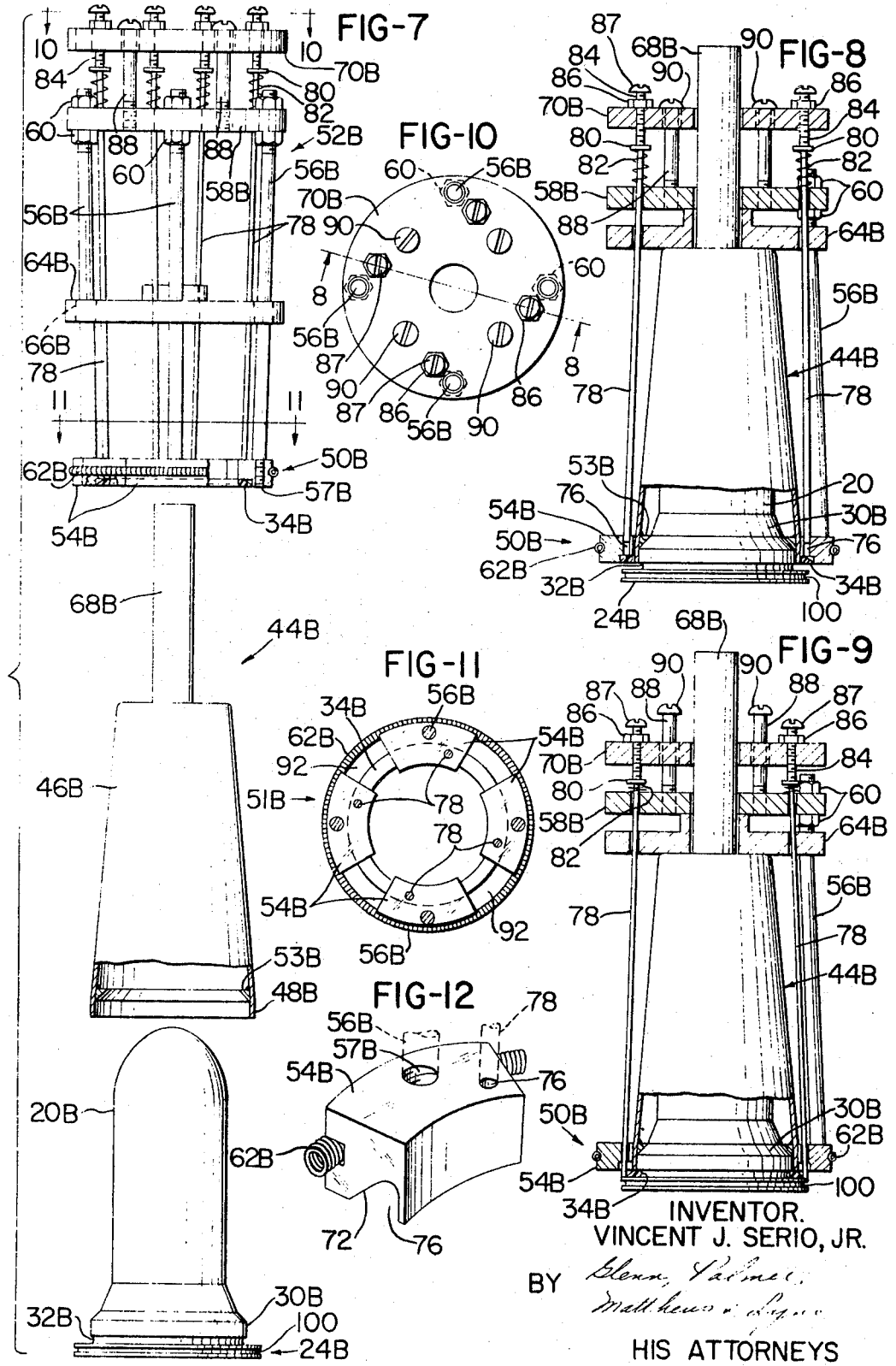
INVENTOR.
VINCENT J. SERIO, JR.
BY
HIS ATTORNEYS

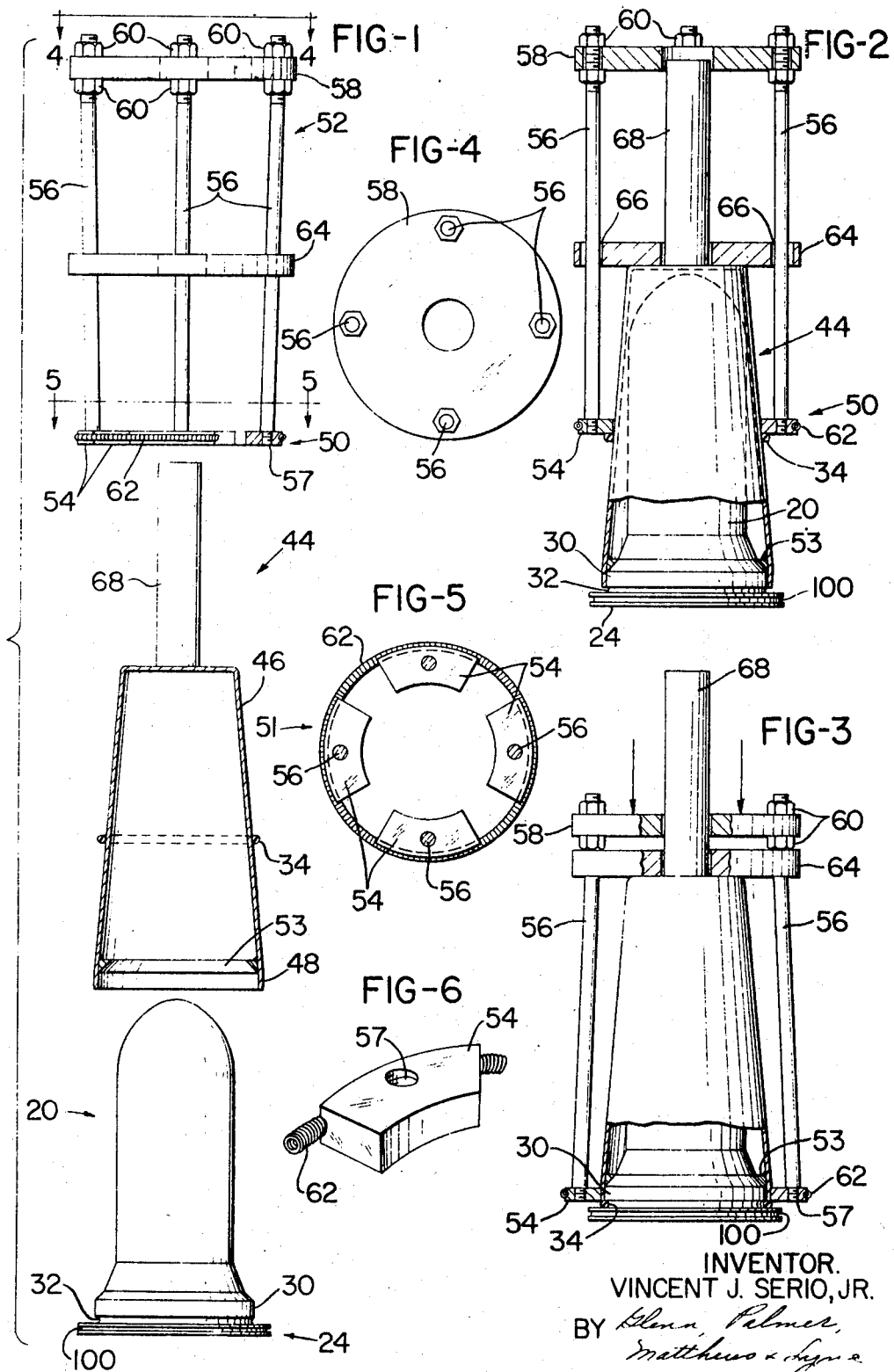

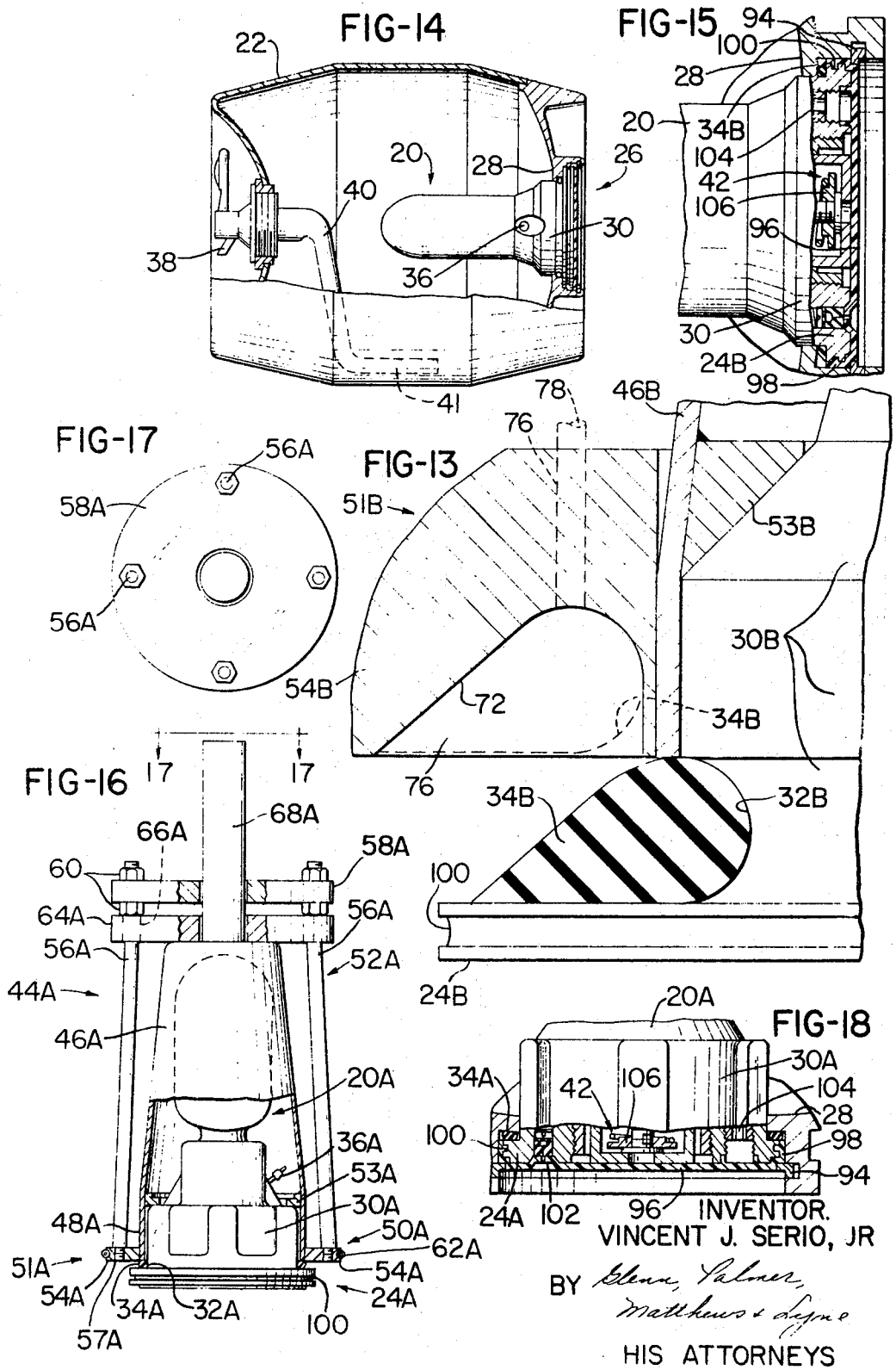

United States Patent Office 3,487,529
Patented Jan. 6, 1970

3,487,529
SEAL MOUNTING APPARATUS AND METHOD
Vincent J. Serio, Jr., Henrico County, Va., assignor to Reynolds Metals Company, Richmond, Va., a corporation of Delaware
Filed Aug. 11, 1966, Ser. No. 571,756
Int. Cl. B23p *11/02, 19/02*
U.S. Cl. 29—235    5 Claims

ABSTRACT OF THE DISCLOSURE

A gas charging capsule is insertable into and removable from a charged liquid dispensing container. The capsule has an end wall structure with a transverse circular flange. The dispenser has a capsule receiving opening shoulder. A flexible seal ring is compressed between said flange and shoulder when said capsule and container are telescoped and secured together. Prior to this telescoping action, a smooth, lightly tapered, cylindraceous, guide member, with the flexible seal around it, is placed around the capsule with a seal delivering end adjacent the capsule circular flange. Seal pushing segments push the flexible seal longitudinally along the guide member, past said seal delivering end, and into a seal receiving groove in said capsule adjacent said capsule circular flange. Then the capsule and container can be telescoped and sealed with said flexible seal between said capsule flange and container shoulder.

---

This invention relates to a seal mounting apparatus and method.

One of the features of this invention includes a method and apparatus for mounting a flexible seal ring on a gas charging capsule which capsule is to be partly inserted in and removed from a charged liquid container.

The method and apparatus provide a means by which the flexible seal ring is guided around the capsule and is placed around the desired seal receiving surface of the capsule. The flexible seal ring is guided and moved in a manner to preserve the efficiency of the seal ring.

The flexible seal ring may be guided around the capsul by a smooth, cylindraceous guide member or sleeve which surrounds the capsule and has means to place the sleeve end adjacent the seal receiving surface of the capsule. A seal ring moving means cooperates with the sleeve to move the seal ring along the sleeve and on to the seal receiving surface of the capsule.

The method and apparatus of this invention are simple and efficient and accomplish the mounting of the seal ring on the capsule quickly and without damage to the ring.

Other features of this invention are apparent from this description, the appended claimed subject matter, and/or the accompanying drawings in which:

FIGURE 1 is a diagrammatic side view of one embodiment of this invention, with the parts in spaced relationship.

FIGURE 2 is a diagrammatic side view, partly in cross-section showing the parts of FIGURE 1 performing one step of the ring mounting procedure.

FIGURE 3 is a view similar to FIGURE 2 and showing another step in the procedure.

FIGURE 4 is a diagrammatic top plan view taken from the line 4—4 of FIGURE 1.

FIGURE 5 is a diagrammatic horizontal cross section taken along the line 5—5 of FIGURE 1

FIGURE 6 is an enlarged perspective diagrammatic view of a segmental portion of the seal moving means of FIGURES 1–6.

FIGURE 7 is a view similar to FIGURE 1, but showing another embodiment of the invention.

FIGURE 8 is a diagrammatic side view of the parts of FIGURE 7 performing one step of the ring mounting procedure.

FIGURE 9 is a diagrammatic view similar to FIGURE 8, and showing another step in the procedure.

FIGURE 10 is a diagrammatic top plan view taken from line 10—10 of FIGURE 7.

FIGURE 11 is a horizontal cross section taken along the line 11—11 of FIGURE 7.

FIGURE 12 is an enlarged perspective diagrammatic view of a segmental portion of the seal moving means of FIGURES 7–13.

FIGURE 13 is an enlarged diagrammatic cross section of certain parts after the seal ring has encircled the ring receiving groove in the embodiment of FIGURES 7–13.

FIGURE 14 is a diagrammatic horizontal view, partly in elevation and partly in cross section, showing the capsule of FIGURES 1–13 inserted in, and sealed to, the capsule receiving opening of the charged liquid dispenser.

FIGURE 15 is an enlarged cross section of a capsule end inserted and sealed in the dispenser opening.

FIGURE 16 is a diagrammatic side view of the parts of another embodiment of the invention performing a step in the procedure.

FIGURE 17 is a diagrammatic top plan view of a portion of FIGURE 16 taken from the line 17—17 of FIGURE 16.

FIGURE 18 is an enlarged view, partly in cross section, of a portion of FIGURE 16.

Certain words are used in this specification and/or in the appended claimed subject matter that indicate direction, relative position, and the like. Such words are used for the sake of clearness and brevity. However, it is to be understood that such words are used only in connection with the drawings, and that in actual use the parts so described may have entirely different direction, relative position, etc. Examples of such words are "vertical," "horizontal," "upward," "downward," "sidewise," etc.

This invention may include a charging gas capsule 20, 20A and 20B which may be partially inserted in a charged liquid dispensing container or dispenser 22. The capsule 20, 20A or 20B may have a capsule flange 24, 24A or 24B to be received in a capsule flange receiving opening 26 of the dispenser 22. Such opening may be formed by the capsule flange receiving shoulder 28 of such dispenser 22.

The capsule 20, 20a or 20B may have a capsule end wall structure 30, 30A or 30B of which the capsule transverse flange 24, 24A or 24B is a part.

The end wall 30, 30A and 30B may have a seal ring receiving surface 32, 32A or 32B, to receive a flexible seal ring 34, 34A and 34B.

The ring 34, 34A or 34B is to be compressed between the shoulder 28 of the dispenser 22 and the flange 24, 24A or 24B of the capsule 20, 20A and 20B to form a fluid tight joint. The ring 34, 34A and 34B may be made of any suitable flexible material, such as rubber or rubber-like material well known to seal manufacturers and others skilled in that art.

The construction is such that the liquid dispenser container 22 may be filled with beverage, such as beer or other carbonated beverages while the capsule 20, 20A, or 20B is outside the liquid container 22. Then the gas capsule 20, 20A or 20B is inserted in the dispenser and sealed thereto in a manner to be described. The capsule 20, 20A or 20B automatically discharges charging gas, such as $CO_2$, through a check valve discharge opening means 36 or 36A into the dispenser 22 to maintain the desired gas charged pressure in the dispenser 22. The charged liquid or beverage may be dispensed through the faucet 38 which is connected by the discharge tube 40 to a low position 41 in the dispenser 22.

The capsule 20, 20A or 20B contains automatic pressure reducing means 42, now well known, which automatically reduces the gas pressure from about 550 to 600 pounds per square inch, above atmosphere, in the capsule 20, 20A or 20B to about 12 to 15 pounds per square inch, above atmosphere, in the charged liquid space of the dispenser 22.

It is desirable frequently to remove and insert the capsule 20, 20A or 20B from and into the dispenser 22 at the brewery for the purpose of refilling the dispenser 22 and washing the capsule 20, 20A or 20B, etc.

It is desirable properly to place the seal ring 34, 34A or 34B on the seal ring receiving surface 32, 32A or 32B when the capsule is to be inserted into the dispenser. It is highly desirable that the seal ring 34, 34A or 34B be properly located on the seal ring receiving surface 32, 32A or 32B in order to insure a fluid tight seal whenever such capsule 20, 20A or 20B is inserted into the dispenser.

The method and apparatus of this invention permits a quick and trouble free placement of the flexible seal ring 34, 34A and 34B on the capsule 20, 20A or 20B before the capsule is inserted into the dispenser 22.

To this end, the flexible seal ring locating means 44 of FIGURES 1–6, 44A of FIGURES 16, 17, and 44B of FIGURES 7–13 may be provided.

Such locating means 44, 44A and 44B have many features in common so that whenever possible a general description is made, which is as applicable as possible to all of the embodiments.

For example, such seal ring locating means 44, 44A and 44B may include a cylindraceous seal ring guide means or sleeve 46, 46A and 46B, which may be provided to surround the capsule 20, 20A or 20B with the guide means end 48, 48A and 48B adjacent the ring receiving surfaces 32, 32A, 32B. Such sleeve may be made of smooth material, such as plated or polished metal, such as aluminum and the like. The sleeve may be tapered slightly, as illustrated, with its lower end 48, 48A and 48B straightened, if desired, to fit over the capsule end wall structure 30, 30A and 30B.

Seal ring moving means 50, 50A and 50B may be provided to move the ring 34, 34A and 34B longitudinally downward along the cylindraceous guide means 46, 46A and 46B.

Moving means 52, 52A and 52B may be provided to move said flexible ring moving means 50, 50A and 50B longitudinally or downwardly along the cylindraceous guide means 46, 46A and 46B finally to locate such flexible seal ring 44, 44A and 44B on or in the seal receiving surface 32, 32A and 32B.

The seal ring guide means 46, 46A and 46B may be provided with capsule abutting means 53, 53A and 53B longitudinally to locate the lower end 48, 48A or 48B of the guide means 46, 46A, 46B adjacent the seal ring receiving surfaces 32, 32A and 32B.

The seal ring moving means 50, 50A and 50B may be seal ring forcing means to force the seal ring 34, 34A and 34B longitudinally along the cylindraceous guide means 46, 46A and 46B, as shown in FIGURES 2, 8 and 16 to locate the seal ring 34, 34A and 34B on the respective seal ring receiving surface 32, 32A and 32B.

The seal ring forcing means 50, 50A and 50B may include, respectively, an expansible annular segment formation 51, 51A, 51B including a plurality of segments 54, 54A and 54B surrounding the cylindraceous guide means 46, 46A and 46B to move the seal ring 34, 34A and 34B along such cylindraceous guide means to the seal ring receiving surfaces 32, 32A and 32B.

The seal ring moving or forcing means may include a plurality of longitudinal segment moving rods 56, 56A and 56B which surround the cylindraceous guide means 46, 46A and 46B. The rods 56, 56A and 56B may be respectively threadedly secured at their lower ends in threaded openings 57, 57A and 57B of the segments 54, 54A and 54B.

Segment rod moving means or plates 58, 58A and 58B move the rods 56, 56A and 56B longitudinally along the cylindraceous guide means 46, 46A and 46B. The plates 58, 58A and 58B may be fixedly secured to such rods 56, 56A and 56B by means of nuts 60 above and below such plates.

The segments 54, 54A and 54B are separable segments embodying a segment formation surrounding the cylindraceous guide means 46, 46A and 46B. The segments may be provided with segment contracting spring means such as a circular coil spring 62, 62A and 62B which contracts the segments toward the cylindraceous guide means 46, 46A and 46B.

A segment rod locating intermediate plate 64, 64A and 46B may respectively be provided intermediate the segments 54, 54A and 54B and the segment rod moving plates 58, 58A and 58B. The locating plates 64, 64A and 64B may have openings 66, 66A and 66B through which the segment moving rods 56, 56A and 56B loosely pass. Such intermediate plate 64, 64A and 64B may properly locate the segments around the cylindraceous guide means 46, 46A, and 46B. Such intermediate plates 64, 64A and 64B also prevent the segment moving rods 56, 56A and 56B and the connected segments 54, 54A and 54B against excessive contraction by the spring means 62, 62A and 62B.

The cylindraceous seal ring guides 46, 46A and 46B may respectively have longitudinal handles 68, 68A and 68B. These handles pass through openings in the plates 58, 58A, 58B; 64, 64A, 64B and pushing rod plate 70B which is to be described.

The seal ring receiving surface 32B of FIGURES 7–13 may be an annular seal ring receiving groove 32B, FIGURE 13, on the end wall formation 30B. The flexible seal ring locating segment formation 51B of segments 54B may cause the seal ring 34B to encircle the groove 32B.

The segments 54B, FIGURES 7–13, may each have an arch shaped bottom surface 72 to receive a teardrop cross sectioned flexible seal ring 34B. The segments 54B may also have a segment moving rod opening 57B to receive a segment moving rod 56B. The segments 54B also may have a pushing rod receiving opening 76 to receive a seal ring pushing rod 78. The pushing rod 78 pushes the flexible seal 34B into the groove 32B when the segments 54B reach the positions shown in FIGURES 8, 9 and 13.

The pushing rods 78 extend through loose openings in the plates 58B and 64B and adjustably engage a pushing rod plate 70B, through which the handle 68B passes.

The plate 70B is spring pressed upwardly from the plates 58B and 64B. The plate 70B may be moved down manually as shown in FIGURES 8 and 9 to push the push rods 78 down to move the seal ring 34B into the seal ring receiving groove 32B, FIGURE 13.

To this end, the push rods 78 may be provided with flat heads 80 which are upwardly biased by the compression springs 82 the upper ends of which engage the heads 80 and the lower ends of which engage the plate 58B. The heads 80 engage the adjustable screws 84 to push the plate 70B upwardly. The screws 84 are threadedly held in plate 70B so that the upward thrust on the screws 84 by the heads 80 pushes the plate 70B upwardly by the spring action of springs 82. The screws 84 may be held in adjusted positions by lock nuts 86 below the screw heads 87.

Bolts 88 are threaded into the plate 58B and are loosely received in plate 70B. The upper heads 90 of the bolts 88 form limit means to limit the upward movement of the plate 70B.

The bolts 88 pass loosely through openings in the plate 70B, so that plate 70B may be manually pressed down. This causes the screws 84 to press the rod heads 80 down to push the push rods 78 downwardly to move the seal 34B into the groove 32B, as shown in FIGURES 9 and 13.

The flexible ring 34B may be teardrop-like in cross section, and may be placed in the arch shaped surface 72. The ring 34B bridges the space 92 between the segments 54B.

The cylindraceous guide means 46B has means 53B to space the end 48B of the guide means adjacent the seal receiving groove 32B, FIGURE 13.

The capsule 20 may be held in the dispenser 22 by means of a split ring 94 which is inwardly biased. The split ring 94 engages the stepped rim of the plastic cover 96. The plastic cover 96 has an inward flange 98 which enters the cover rim receiving groove 100 in the flanges 24, 24A and 24B of the capsules 20 and 20B.

The capsules may have a $CO_2$ charging needle plug 102, a pressure relief rupture disc construction 104, a pressure reducing valve construction 106 and other parts now well known.

The compressed flexible seal 34A is shown between the dispenser shoulder 28 and the capsule flange 24A in FIGURE 18. The compressed seal 34B is shown between the dispenser shoulder 28 and the capsule flange 24B in FIGURE 15.

In FIGURES 1–6 and 16–18, the seal rings 34 and 34A can be placed manually on the cylindraceous guide means 46 and 46A, as shown at 34 in FIGURE 1. The cylindraceous guide means 46 and 46A may then be placed around the capsules 20 and 20A. Then the moving means 52 of FIGURES 1–6, and 52A of FIGURES 16–18 may be manually moved downwardly by the plates 58 and 58A with the segments 54 and 54A pushing the seals down along the cylindraceous guide means 46 and 46A until the seals are pushed on to the seal receiving surfaces 32 and 32A.

In FIGURES 7–13, the flexible seal 34B may be placed in the arch shaped bottom surfaces of the segments 54B, as shown in FIGURE 7. The cylindraceous guide means 46B may be placed over the capsule 20B. Then the moving means 52B may be telescoped over the cylindraceous guide means 46B with the plates 64B, 58B and 70B telescoped over the handle 68B. Then the plate 58B is manually pushed down until the parts reach the positions of FIGURE 8 where the seal 34B is about to be inserted in the groove 32B. Then the plate 70B is manually pushed down to cause the push rods 78 to push the seal 34B from the position in FIGURE 8 to the position in FIGURES 9 and 13 with the seal 34B in the groove 32B.

It is thus to be seen that a new, useful and unobvious seal mounting apparatus and method have been provided.

While the form of the invention now preferred has been disclosed as required by statute, other forms may be used, all coming within the scope of the claimed subject matter which follows.

What is claimed is:

1. An apparatus for positioning, guiding and inserting an annular flexible seal ring in an annular seal ring receiving grooved surface of a device comprising a cylindraceous seal ring guide means to surround said device and having a guide means end to be disposed adjacent said ring receiving surface, said guide means having abutting means to engage said device and locate said guide end means adjacent said grooved surface of said device, a seal ring moving means surrounding side guide means to move said seal ring along said guide means to locate said seal ring at said guide end means for insertion into said grooved surface of said device, said seal ring moving means comprising an expansible annular segment formation having a plurality of segments surrounding said cylindraceous seal ring guide means to move said seal ring along said cylindraceous seal ring guide means to said seal ring receiving surface, said seal ring moving means also comprising a plurality of longitudinal segment moving rods surrounding said seal ring guide means, said rods being respectively secured to said segments at one end thereof, a segment rod moving plate secured to the other ends of said rods to move said rods longitudinally along said cylindraceous seal ring guide means, and a segment rod locating intermediate plate intermediate said segments and said rod moving plate and having segment rod receiving openings through which said segment rods pass, said intermediate plate holding said segments against excessive contraction.

2. An apparatus according to claim 1 wherein cylindraceous seal ring guide means has a longitudinal handle, and wherein said plates have openings through which said handle passes.

3. An apparatus according to claim 2 wherein said segments each has an arch shaped bottom surface to receive a flexible seal ring in said arch shaped bottom surface; and a plurality of pushing rods respectively passing through each of said segments to push said flexible seal ring out of said arch shaped bottom surfaces into said seal ring receiving groove.

4. An apparatus according to claim 3 wherein said seal pushing rods extend through said two first-named plates and are adjustably engaged with a seal pushing rod plate, said handle passing through said seal pushing rod plate, said seal pushing rod plate being spring pressed upwardly from said two first-named plates and being downwardly movable to push said push rods down to move said seal ring out of said arch shaped bottoms and into said seal receiving groove.

5. An apparatus according to claim 4 wherein limit means are carried by said rod moving plate to limit upward movement of said seal pushing rod plate relative to said rod moving plate.

References Cited

UNITED STATES PATENTS

| | | | |
|---|---|---|---|
| 2,422,549 | 6/1947 | Hogin | 29—235 |
| 2,660,780 | 12/1953 | Beck | 29—235 |
| 3,030,700 | 4/1962 | Jensen | 29—235 X |
| 3,036,371 | 5/1962 | Gray et al. | 29—235 |
| 3,111,749 | 11/1963 | Loxterman | 29—235 |
| 3,115,701 | 12/1963 | Jones | 29—235 X |
| 3,132,414 | 5/1964 | De Bacco et al. | 29—235 |
| 3,145,463 | 8/1964 | Hockett | 29—235 X |
| 3,158,923 | 12/1964 | Reinsma | 29—450 X |
| 3,180,015 | 4/1965 | Thomson et al. | 29—235 |
| 3,183,587 | 5/1965 | Baskell | 29—451 |
| 3,243,085 | 3/1966 | Wilson | 222—399 X |
| 3,245,583 | 4/1966 | Miller et al. | 222—3 X |
| 3,319,325 | 5/1967 | Nessamar et al. | 29—235 |
| 3,347,083 | 10/1967 | Turpin et al. | 29—235 X |

JOHN F. CAMPBELL, Primary Examiner

D. C. REILEY, Assistant Examiner

U.S. Cl. X.R.

29—451; 222—399